(12) United States Patent
Cheiky

(10) Patent No.: US 10,538,712 B2
(45) Date of Patent: *Jan. 21, 2020

(54) MICRO-GASIFIER ARRAY NETWORKING

(71) Applicant: V-GRID Energy Systems, Camarillo, CA (US)

(72) Inventor: Michael Cheiky, Camarillo, CA (US)

(73) Assignee: V-GRID Energy Systems, Camarillo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/294,850

(22) Filed: Mar. 6, 2019

(65) Prior Publication Data
US 2019/0203132 A1 Jul. 4, 2019

Related U.S. Application Data

(60) Division of application No. 15/269,817, filed on Sep. 19, 2016, now Pat. No. 10,266,780, which is a (Continued)

(51) Int. Cl.
*C10J 3/72* (2006.01)
*C10J 3/84* (2006.01)
(Continued)

(52) U.S. Cl.
CPC ............... *C10J 3/721* (2013.01); *C10J 3/723* (2013.01); *C10J 3/84* (2013.01); *F01D 15/10* (2013.01);
(Continued)

(58) Field of Classification Search
CPC ............ C10J 3/721; C10J 2200/33; C10J 2300/1643; C10J 2300/167; C10J 3/84;
(Continued)

(56) References Cited

U.S. PATENT DOCUMENTS 4,870,817 A 10/1989 Conn
9,469,821 B2* 10/2016 Cheiky ............... F02D 19/04
(Continued)

FOREIGN PATENT DOCUMENTS

CN 101967398 A1 2/2011
DE 102009031305 A1 1/2011
(Continued)

OTHER PUBLICATIONS

International Search Report in PCT/US2014/049095, dated Nov. 28, 2014.
(Continued)

*Primary Examiner* — Jacob M Amick
*Assistant Examiner* — Charles Brauch
(74) *Attorney, Agent, or Firm* — Sheppard Mullin Richter & Hampton LLP

(57) ABSTRACT

A method is described for integrating a plurality of micro-gasifiers comprising gasifiers, filters, and engine sets or turbine gensets or combined cycle gensets by linking them via a common bus wherein air flow and engine fuel flow is regulated by valves controlling gas flow between the bus and engine genset or turbine genset or combined cycle genset.

5 Claims, 5 Drawing Sheets

Related U.S. Application Data continuation-in-part of application No. 14/448,007, filed on Jul. 31, 2014, now Pat. No. 9,469,821.

(60) Provisional application No. 61/867,716, filed on Aug. 20, 2013.

(51) Int. Cl.

| | | |
|---|---|---|
| *F01D 15/10* | (2006.01) | |
| *F02M 21/06* | (2006.01) | |
| *F02M 25/12* | (2006.01) | |
| *F02D 19/04* | (2006.01) | |
| *F02D 25/00* | (2006.01) | |
| *F02D 29/06* | (2006.01) | |
| *F02M 21/02* | (2006.01) | |
| *F02B 1/04* | (2006.01) | |
| *F02B 43/08* | (2006.01) | |
| *F02B 43/10* | (2006.01) | |
| *F02M 27/02* | (2006.01) | |

(52) U.S. Cl.
CPC ............. *F02D 19/04* (2013.01); *F02D 25/00* (2013.01); *F02D 29/06* (2013.01); *F02M 21/0218* (2013.01); *F02M 21/06* (2013.01); *F02M 25/12* (2013.01); *C10J 2200/33* (2013.01); *C10J 2300/1643* (2013.01); *C10J 2300/1671* (2013.01); *F02B 1/04* (2013.01); *F02B 43/08* (2013.01); *F02B 43/10* (2013.01); *F02M 27/02* (2013.01); *Y02T 10/121* (2013.01); *Y02T 10/32* (2013.01); *Y02T 10/34* (2013.01)

(58) Field of Classification Search
CPC .......... C10J 3/723; F02D 29/06; F02D 19/04; F02D 25/00; F01D 15/10; Y02T 10/32; Y02T 10/34; F02M 27/02; F02M 25/12; F02M 21/0218; F02M 21/06; F02B 43/10; F02B 43/08; F02B 1/04
See application file for complete search history.

(56) References Cited

U.S. PATENT DOCUMENTS

| | | | |
|---|---|---|---|
| 2002/0046686 A1* | 4/2002 | Sunter | ......................... C10J 3/16 110/347 |
| 2002/0069798 A1 | 6/2002 | Aguadas | |
| 2006/0265954 A1 | 11/2006 | Dogru | |
| 2007/0006528 A1 | 1/2007 | Diebold | |
| 2007/0011945 A1 | 1/2007 | Grootveld | |
| 2008/0115495 A1 | 5/2008 | Rising | |
| 2010/0000024 A1 | 1/2010 | Capello | |
| 2010/0126135 A1 | 5/2010 | Joshi | |
| 2010/0148518 A1 | 6/2010 | Algrain | |
| 2010/0327592 A1 | 12/2010 | Boot | |
| 2011/0146278 A1* | 6/2011 | Deng | ...................... F01K 7/223 60/653 |
| 2012/0160191 A1 | 6/2012 | Wang et al. | |
| 2012/0227683 A1 | 9/2012 | Scott et al. | |
| 2013/0167533 A1* | 7/2013 | Bruckner | .............. F01K 23/101 60/645 |
| 2014/0202068 A1 | 7/2014 | Depuy et al. | |

FOREIGN PATENT DOCUMENTS

| | | |
|---|---|---|
| EP | 2447339 A1 | 5/2012 |
| EP | 2503110 A1 | 9/2012 |
| WO | 2008068596 A1 | 6/2008 |
| WO | 2009158579 A2 | 12/2009 |

OTHER PUBLICATIONS

First Office Action in Chinese Patent Application No. 201480045430.3, dated Feb. 17, 2017.
Extended European Search Report in EP Application No. 14837259.2, dated May 11, 2017.
First Examination Report in Indian Patent Application No. 201637004872, dated Mar. 11, 2019.

\* cited by examiner

United States Patent US 10,538,712 B2

MICRO-GASIFIER ARRAY NETWORKING

RELATED APPLICATIONS

This application is a divisional of U.S. patent application Ser. No. 15/269,817 filed on Sep. 19, 2016, which is a continuation-in-part of U.S. patent application Ser. No. 14/448,007 filed on Jul. 31, 2014, now U.S. Pat. No. 9,469,821, which claims priority to U.S. Provisional Patent Application No. 61/867,716 filed on Aug. 20, 2013, the contents of which are incorporated herein by reference in their entireties.

FIELD OF THE INVENTION

The invention broadly relates to micro-gasifier array networking.

BACKGROUND OF THE INVENTION

Micro-gasifiers were used extensively in Europe during World War II to power internal combustion engine vehicles while conventional gasoline was very difficult to obtain. The basic operating principles of such devices will now be described. Initially, dry biomass is combusted in an enclosed container under a mild vacuum as generated by the intake manifold of a reciprocating piston engine. Air inlets and gasifier output stream connections are arranged so that the biomass is only partially combusted, resulting in an exhaust stream which contains carbon monoxide and may additionally contain hydrogen and hydrocarbon gasses. This gas can be further combusted in an internal combustion engine to produce shaft power.

FIG. 1 (prior art) illustrates a typical layout of such devices including gasifier, filter, startup and turn off flare, air mixing valves and an internal combustion engine. The normal startup procedure is to light the gasifier and bring it up to a temperature which produces a sufficient amount of combustible gasses to at least idle the attached internal combustion engine. This is typically done by initially routing the output of the gasifier to a flare device, which protects operating personnel from the highly toxic carbon monoxide gas generated by the gasifier. Various schemes for initiating airflow through the gasifier are used such as incorporating an aspirating pump in the flare device or an inline blower in the flare device, thus creating a partial vacuum in the gasifier. Alternatively, an input blower can be utilized on the gasifier to force air through the system. However, this is generally regarded as less desirable because positive pressure in the gasifier device can result in highly toxic carbon monoxide gas leakage from various system components such as monitoring ports, biomass feed and ash ports, and various system interconnections.

Once airflow is set up through the gasifier, its combustion zone can be lit by any of the various techniques used to start a wood fire, with initiation by a propane torch device being one of the most common techniques in current use. Dependent upon the size of the gasifier, and the oxidation state and moisture content of the biomass fuel located in the gasifier, startup will typically take three to 30 minutes. In order to maintain area safety, the flare should be equipped with an igniter which burns escaping carbon monoxide gas. Once a sufficient quantity of combustible gases are present in the gasifier output stream, the flare valve is closed, the genset gasifier valve is opened and the attached engine is cranked with dynamic adjustment to the air inlet valve in order to provide a combustible mix suitable for firing the engine cylinder(s). In normal operation the engine's displacement revolution rate (RPM) and load demands provide a degree of regulation of the input airstream to the gasifier and thus the rate at which biomass is consumed in its internal partial combustion process. This partial combustion process typically consumes all of the oxygen in that input stream so the air inlet valve on the engine is adjusted to provide enough oxygen for a suitable air fuel ratio for the desired output power.

On turn off the engine's ignition system and/or its air supply valves are turned off, which stops the engine and stops flowing air through the gasifier. The gasifier core temperature may be well above 1,000 degrees centigrade and the system may be equipped with multiple layers of insulation so that it will typically take several hours for the gasifier to cool down to room temperature. Restart delay is typically directly proportional to the amount of time the gasifier has been off, with shut down durations of a few minutes resulting in nearly instantaneous restart due to the residual combustible gases retained by the system and the high combustion zone core temperature.

Internal combustion engines typically produce peak operating efficiency at a specific design point. Such a design point is dominated by frictional and accessory losses on the low side and non-optimal combustion dynamics on the high end particularly if the engine designers have pushed the peak output rating of the engine past the optimal combustion operating region. Likewise, the gasifier is limited by heat losses on the low end which will limit the internal core temperature and, thus, the gasification rate and quality. At the high end, gasifier system constraints like biomass mass flow, air mass flow, air jetting geometry and hot zone geometry limit the gasifier's performance. Consequently, the combination of the gasifier and internal combustion engine will typically result in a fairly narrow power range for peak operating efficiency.

SUMMARY OF THE INVENTION

Embodiments of the invention are directed toward micro-gasifier array networking.

One embodiment of the invention is directed toward an apparatus comprising: a multi-gasifier array comprising a common gasifier bus or multi-tap pipeline connecting two or more micro-gasifier systems; and a plurality of valves for regulating the flow of gas within the micro-gasifier array. This gas can include air, syngas, external hydrogen, or external natural gas.

DETAILED DESCRIPTION

In the following paragraphs, embodiments of the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Embodiments of the invention pertain to the use of two or more micro-gasifier systems in an application where: (i) the demand for shaft power varies widely and rapidly over time, and (ii) biomass conversion efficiency is important such as in an electrical micro-grid.

Figure 1:
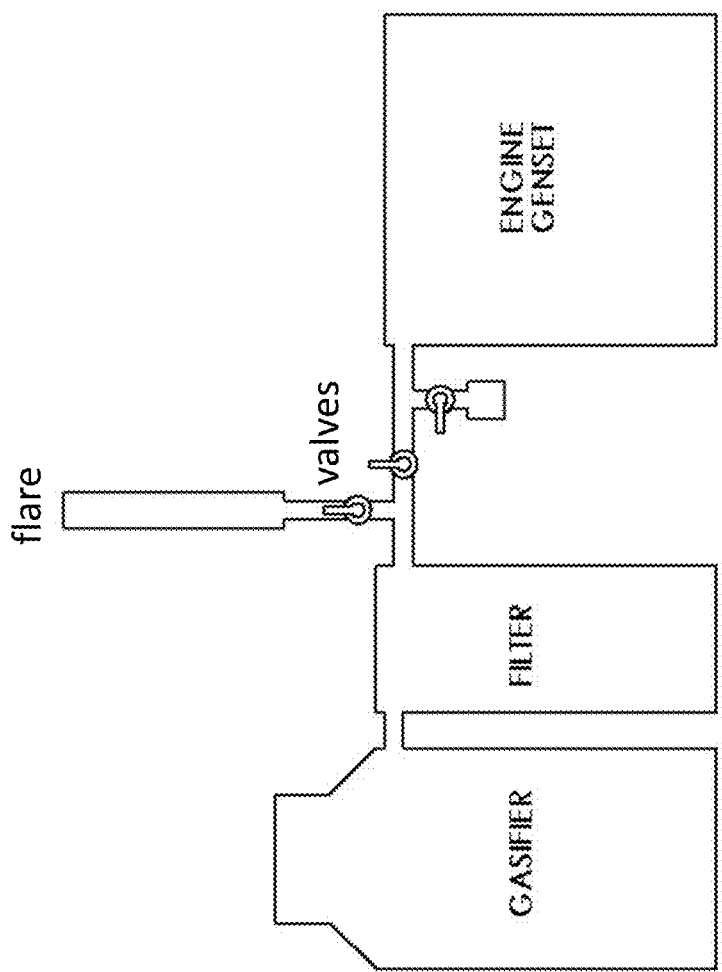
FIG. 1 is a diagram illustrating a typical micro-gasifier layout.
Figure 2:
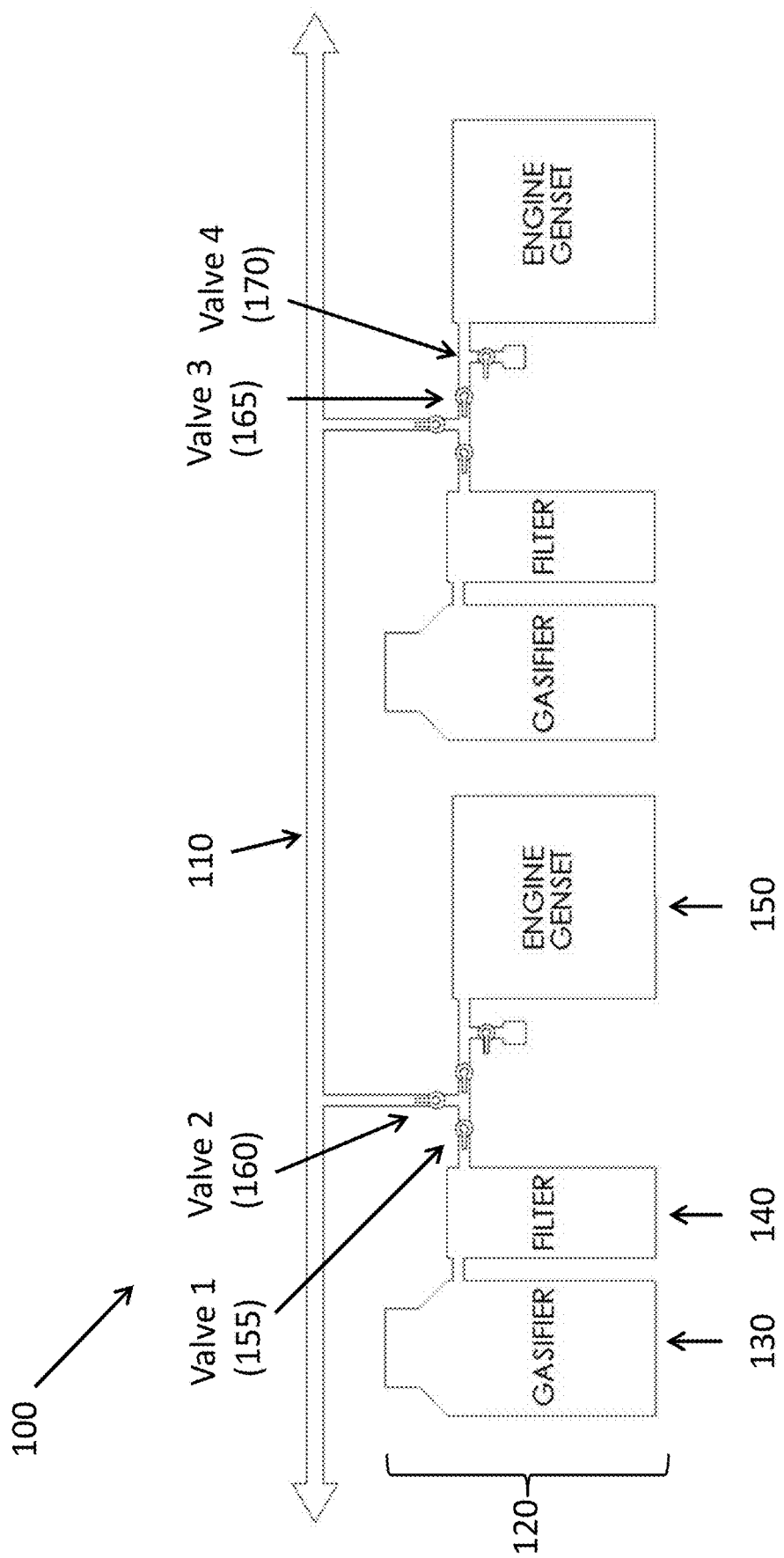
FIG. 2 is a diagram illustrating a multi-gasifier array comprising a common gasifier bus or multi-tap pipeline connecting two or more micro-gasifier systems.

FIG. 2 illustrates a multi-gasifier array 100 comprising a common gasifier bus 110 or multi-tap pipeline connecting two or more micro-gasifier systems 120, such as the gasifier described with respect to FIG. 1. In the illustrated embodiment, each gasifier system 120 comprises a gasifier 130, a filter 140 and an engine genset 150. The interaction between the gasifier bus 110 and each micro-gasifier system 120 is defined by the dynamic control of four airflow valves 155, 160, 165, 170 as depicted in FIG. 2. Several modes of operation are possible with this geometry, thus providing enhanced system throughput efficiency as compared to a simple array of isolated units, i.e., without the gasifier bus interconnects.

FIG. 2 depicts the use of a number of valves including Valve 1 (155), Valve 2 (160), Valve 3 (165), and Valve 4 (170). Although four valves are employed in this embodiment, any number of valves may be employed without departing from the scope of the invention. In order to explain the modes of operation of the multi-gasifier array, the function of each of the valves will now be described.

Valve 1 comprises the gasifier output valve 155. This valve 155 regulates the rate in which air is drawn through the gasifier 130.

Valve 2 comprises the gasifier bus valve 160. This bi-directional valve 160 regulates the flow of gas from the gasifier 130 to the gasifier bus 110, or the flow of gas from the bus 110 to the engine, or closes to isolate the system from the bus 110.

Valve 3 comprises the engine fuel input valve 165. This valve 165 regulates the amount of input gas to the engine and is partially responsible for regulating the amount of vacuum or the pressure delta between the gasifier bus 110 and atmospheric conditions.

Valve 4 comprises the engine air input valve 170. This valve 170, in conjunction with Valve 3 (165): (i) regulates the air fuel mixture to the engine, and (ii) regulates the amount of vacuum generation or pumping action by the engine.

Still referring to FIG. 2, a large number of operating modes are possible with the illustrated gas flow network configuration. Several of the key operating modes will now be described.

Mode A comprises conventional isolated system operation. In this mode, Valve 1 (155) is opened, Valve 2 (160) is closed, and Valves 3 and 4 (165, 170) are modulated by the engine controller, which can be either automatic or manually controlled in order to produce the desired power output. Mode A requires the gasifier 130 to be at operating temperature.

Mode B comprises flareless gasifier startup. Under this mode, one or more arrayed systems 120 are operating at power and it is desired to bring one or more additional gasifiers on line. In Mode B, Valves 1, 2 and 4 (155, 160, 170) of one or more operational systems are adjusted to draw gas from the gasifier bus 110 in addition to the gas stream coming from the local gasifier 130. This creates a partial vacuum on the gasifier bus 110, which initially is filled with air, thus offsetting part of the flow normally supplied by Valve 4 (170). The air supply to the gasifier bus 110 is provided by a system in startup mode where Valves 1 and 2 (155, 160) are open and Valves 3 and 4 (165, 170) are closed, thereby drawing air through a non-burning gasifier to supply some of the air required to power one or more operating system engines. This gasifier 120 is then lit by any conventional means and as its generation of combustible gasses increases, Valve 4 (170) in the corresponding gas receiving engine(s) is adjusted to maintain proper air fuel ratio. Once this gasifier 120 is up to operating temperature, all operating systems can switch to Mode A (including this freshly started gasifier) by cranking and starting its corresponding engine.

Mode C comprises gasifier shutdown. It is desirable to utilize the residual gasses in the gasifier 120 on shutdown in order to minimize the leakage of carbon monoxide gas into the surrounding environment and to make effective use of the stored thermal energy in the gasifier 120. Under this mode of operation, when the gasifier system 100 is shut down, first its engine is turned off by closing Valves 3 and 4 (165, 170) and opening Valve 2 (160), thereby allowing the operating gasifier 120 to contribute to the overall system. Next, Valve 1 or 2 (155 or 160) is gradually throttled back to shut down and cool the gasifier 120 in an orderly fashion.

One or more bus systems must adjust Valves 2, 3 and 4 (160, 165, 170) to utilize the gas flow generated by this gasifier 120 as it ramps from combustible gas mode down to a low flow of gas which contains some residual oxygen.

Mode D comprises hot idle. In order to maintain fast response capability to transient load requirements, it can be desirable to keep one or more gasifiers 120 at hot idle so that they can ramp quickly to produce large quantities of combustible gasses when needed. This can be accomplished by turning off their corresponding engines and holding them at low flow rates, as described in Mode C. As an alternative control scheme, they may be pulsed between high and low flow levels using the same technique.

Mode E comprises peak power generation. If the system engines incorporate modern electronic ignition controls, they can be configured to rapidly start and run in a fashion similar to the start/stop operation of many late model cars that turn their engines off at stoplights and start very quickly when the throttle is applied. Thus, the engines can ramp much faster than the gasifiers 120. However, operating gasifiers have substantial filter volumes filled with combustible gasses such that one or more engines running at full power can contribute a small amount of gas from their filter tanks to other engines without substantially reducing their power output. In this mode of operation, Valve 2 (160) is opened on one or more systems operating at power and Valves 2, 3 and 4 (160, 165, 170) are opened with Valve 1 (155) closed on additional systems which are currently in the off state to provide rapid transient power response.

In some embodiments, multi-mode operation is employed. As would be appreciated by those of ordinary skill in the art of networking topology, multiple modes of operation are possible, particularly in a large array of systems, without departing from the scope of the present invention. In such systems, attention must be paid to the complexity of the interconnecting bus lines.

Figure 3:
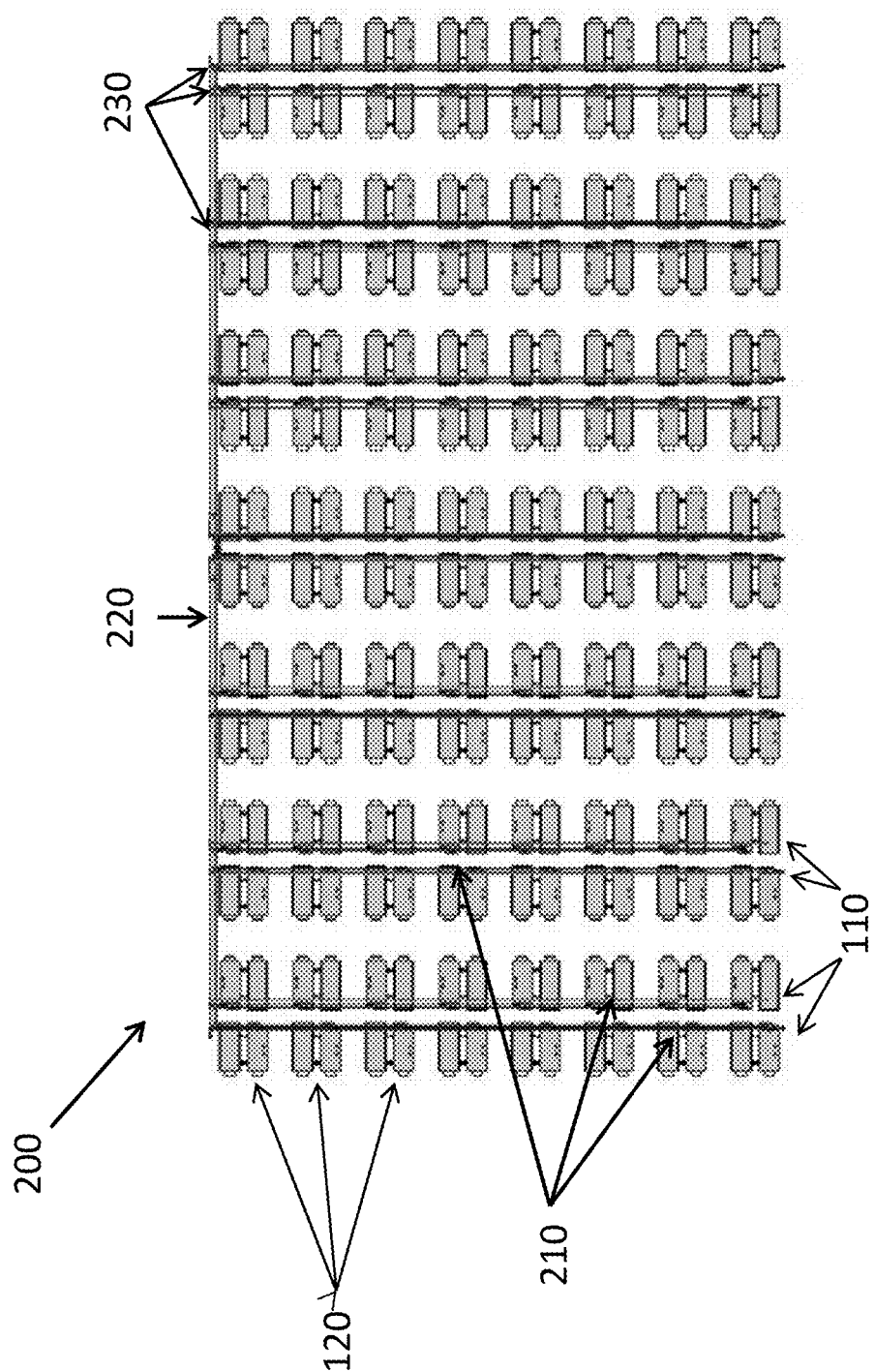
FIG. 3 is a diagram illustrating a multi-gasifier array comprising a common gasifier bus or multi-tap pipeline connecting two or more micro-gasifier systems.

FIG. 3 is a diagram illustrating a multi-gasifier array 200 comprising multiple gasifier busses 110 with multiple Valve 2 interconnects 210. In order to support multiple gasifier systems running in different modes, it may be desirable to have multiple gasifier busses 110 with multiple Valve 2 interconnects 210. However, the system complexity and cost associated with additional valves and the dead volume and residual gas volumes associated with occasional use of various modes becomes a limiting factor. Although it is always possible to highly optimize a system topology when use pattern is highly regular, certain tradeoffs must be made in the real world between versatility versus network complexity.

FIG. 3 depicts an example large network topology in which a physical array of 112 gasifier systems 120 is laid out as fourteen rows of eight gasifiers. The row configuration is selected to allow service access to individual gasifier systems 120 and efficient interconnects of the various feeds and physical wiring. Each of the gasifier systems 120 in a row is connected to gasifier systems in a common bus 110 that is then eight gasifiers long. The individual row gasifier lines are then connected to crossbar trunk lines 220, which span the entire array 200 to individual Valve 5s (230). One to three of these crossbar trunk lines 220 may be suitable.

Figure 4:
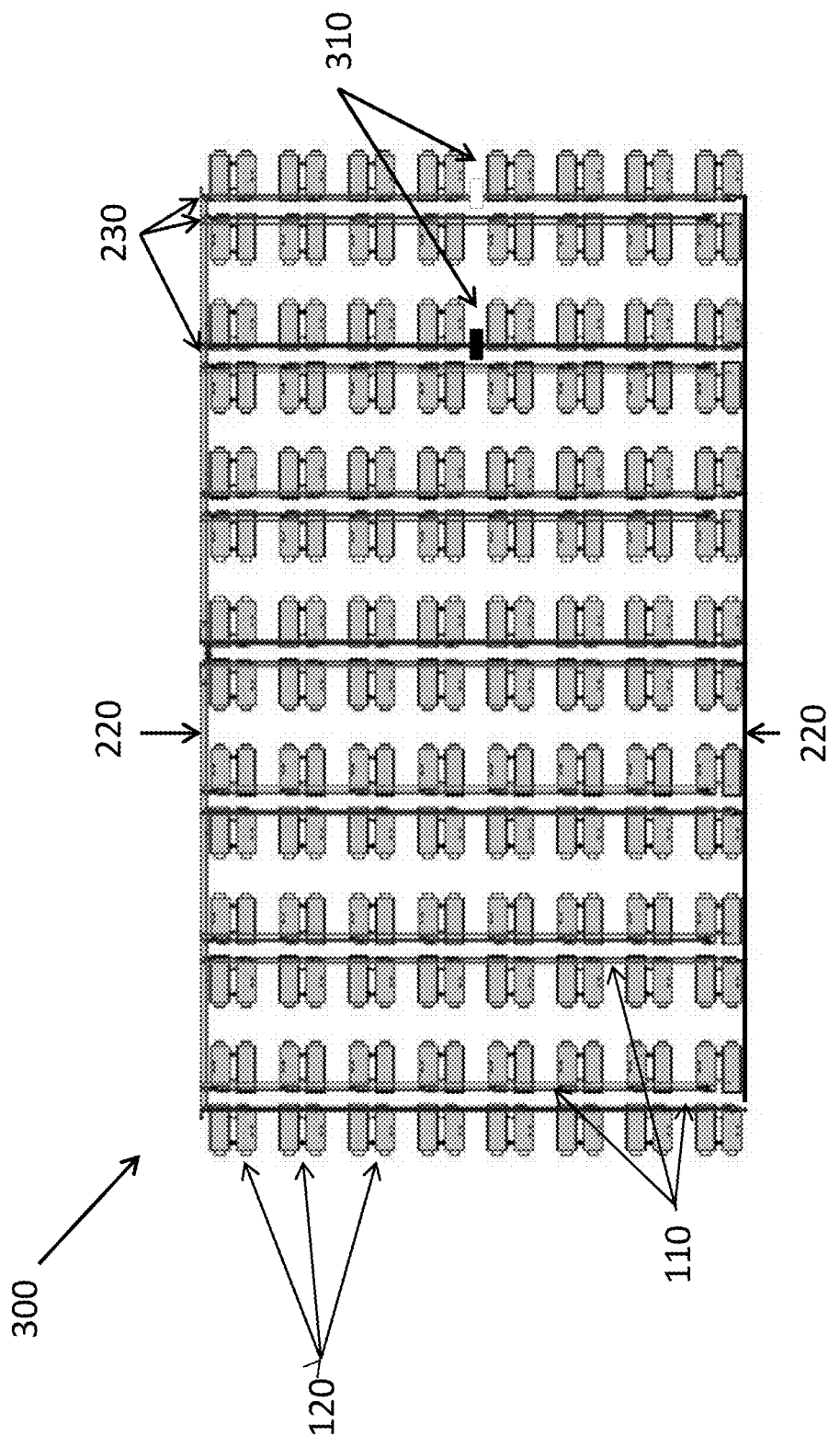
FIG. 4 is a diagram illustrating another multi-gasifier array comprising a common gasifier bus or multi-tap pipeline connecting two or more micro-gasifier systems.

FIG. 4 is a diagram illustrating an additional multi-gasifier array 300 comprising multiple gasifier busses 110. This topology features multiple row/column (i.e., crossbar) interconnect patterns, and can also include bus isolation valves 310 in line on each of the gasifier column and row busses as Valve 6 (310). The illustrated topology also includes a second crossbar trunk line 220. Of course, a wide range of other topologies are possible without departing from the scope of the invention.

In some embodiments, multiple gasifier bus lines 110 with multiple Valve 2 (160) connections as Valve 2, Valve 2', Valve 2", etc. may be utilized in gasifier/engine configurations which produce outputs in addition to electricity such as process hydrogen, and/or biochar.

Figure 5:
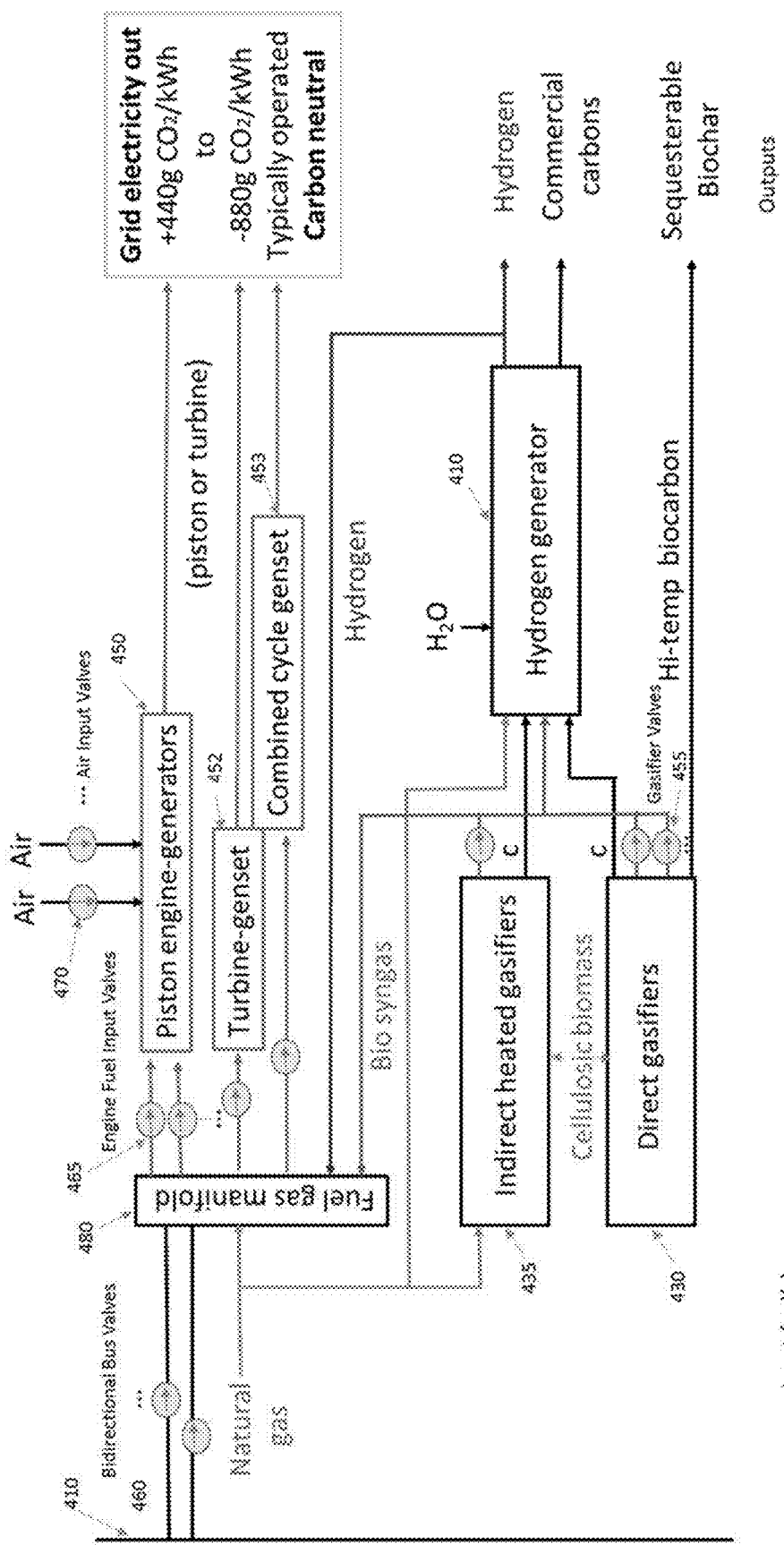
FIG. 5 is a diagram illustrating present invention with multiple fuel inputs and a fuel gas manifold feeding to multiple possible gensets.

A diagram illustrating this multiplicity of outputs as well as multiplicity of engine/generator configurations is shown in FIG. 5. A system of directly heated gasifiers 430 or indirectly heated gasifiers 435 gasify cellulosic biomass to produce biologically derived syngas and carbon. The resulting bio-syngas is fed to fuel gas manifold 480 and syngas flow out of gasifiers 430 or 435 is controlled by Gasifier Valve 1, 1', 1", etc (455) which regulate the flow out of each gasifier to fuel gas manifold 480. The generated syngas can also alternatively be directed to a hydrogen generator 410 which comprises a system for generating hydrogen from multiple sources and for separating hydrogen from a gas mixture. The carbon from either the indirectly heated gasifier or directly heated gasifier can be directed to the hydrogen generator where additional gasification occurs for the purpose of producing syngas in the presence of steam or hydrogen in the presence of natural gas. Hydrogen is generated from the following reactions in the presence of carbon or methane from natural gas:

$$C + H_2O \rightarrow H_2 + CO \quad [1]$$

$$CH_4 + H_2O \rightarrow 3H_2 + CO \quad [2]$$

$$C + CH_4 \rightarrow 2H_2 + 2C \quad [3]$$

Reaction 3 decarbonizes natural gas by reacting natural gas on the surface of a biocarbon and produces, in addition to hydrogen, a fine carbon which has utility as commercial industrial carbon (e.g. carbon in tires, activated carbon, etc.). A carbon resulting from the direct gasification can also alternatively be sequestered for long term storage in soils as biochar.

Fuel manifold 480 regulates the flow of input fuels natural gas, hydrogen from the hydrogen generator, or bio-syngas from the gasifiers to gensets 450, 452, 453 via Engine Fuel Input Valves 3, 3', 3", etc. (465). Genset 450 may be a piston engine generator such as a reciprocal internal combustion engine connected to a generator. Genset 452 refers to a turbine or microturbine generating electricity. Genset 453 refers to a combined cycle system which uses waste heat from a gas turbine and routes it to a steam turbine, thereby generating extra electricity. Flow of fuel or air to the common bus 410 is achieved via Bidirectional Bus Valves 2, 2', 2", etc. (460). Air flow from ambient to gensets 450, 452, 453 is regulated by Air Input Valves 4, 4', 4", etc. (470).

All previously discussed operating modes A-E may be implemented during operation of the interconnected systems in FIG. 5. Extra flexibility is provided in the ability to input natural gas or hydrogen as fuel in the combustion process. Management of gas flow within the bus is performed by drawing air or syngas or hydrogen or natural gas from the gasifier bus and creating a partial vacuum on the gasifier bus which is initially filled with air, thus ensuring regulation of a pressure delta between the gasifier bus and atmospheric conditions. The bi-directional gasifier bus valves may also be used to regulate the flow of air or syngas or hydrogen or natural gas from the gasifier or hydrogen generator to the gasifier busses or the flow of air or syngas or hydrogen or natural gas from the gasifier busses to the engine genset or turbine genset or combined cycle genset. Multiple gasifier busses may be interconnected as shown in FIGS. 3 and 4 using the gasifier system of FIG. 5 as the basic unit.

The present method for operating an array of microgasifiers enables operation of the array in a manner that maximize economics, fuel utilization, or minimizes carbon emissions. For example, production of carbon neutral electricity is achievable by inputting natural gas and offsetting the emissions from the natural gas combustion with corresponding production of sequesterable biochar. Carbon neutral mode can be run in a manner that maximizes natural gas use or biomass use, leading to different economic results due to different feedstock costs. Similarly, an operating mode can be implemented which decarbonizes natural gas and produces hydrogen in addition to carbon neutral electricity and commercial carbons. In some embodiments, the hydrogen production is maximized at the expense of reduction in emissions by inputting the commercial carbon into the gasifier.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A multi-gasifier array, comprising:
a physical array of micro-gasifier systems under vacuum including a plurality of gasifier rows and columns interconnected via gasifier column and row busses, a plurality of gasifier busses connected by a plurality of bi-directional gasifier bus valves, with each gasifier bus connecting two or more micro-gasifier systems, each micro-gasifier system comprising a gasifier, a filter and a genset; and
a plurality of airflow valves, including the bi-directional gasifier bus valves to regulate the flow of gas or hydrogen or natural gas via differential vacuum from the gasifier to the gasifier busses or the flow of gas or hydrogen or natural gas via differential vacuum from the gasifier busses to an engine genset or turbine genset or combined cycle genset.

2. The multi-gasifier array of claim 1, wherein the genset comprises an engine genset, a turbine genset or a combined cycle genset.

3. The multi-gasifier array of claim 1, wherein each of the micro-gasifier systems in a row is connected to other micro-gasifier systems in a common bus.

4. The multi-gasifier array of claim 3, wherein each common bus is connected to one or more crossbar trunk lines, which span the entire array.

5. The multi-gasifier array of claim 3, further comprising a bus isolation valve in line on each of the gasifier column and row busses.

* * * * *